Aug. 19, 1952    C. B. STAMBAUGH, JR    2,607,396
CONVERTIBLE BABY CART AND AUTOMOBILE SEAT
Filed Aug. 7, 1950
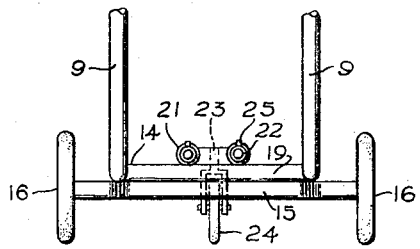
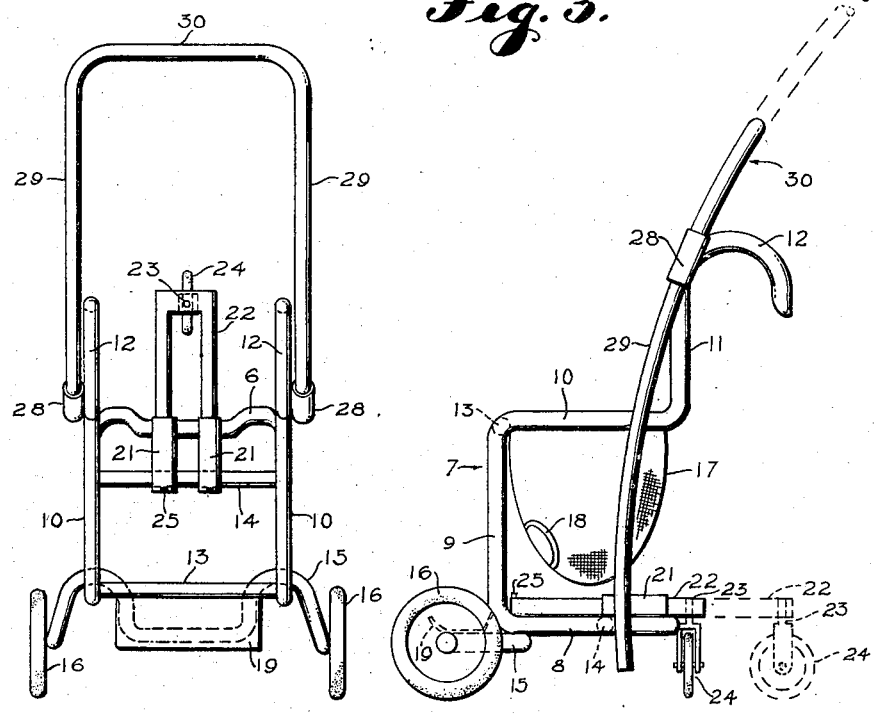
INVENTOR.
C. B. Stambaugh, Jr.
BY Stedman B. Hoar
Agent

UNITED STATES PATENT OFFICE 2,607,396

CONVERTIBLE BABY CART AND
AUTOMOBILE SEAT

Charles B. Stambaugh, Jr., Tucson, Ariz.

Application August 7, 1950, Serial No. 178,109

5 Claims. (Cl. 155—11)

This invention relates to wheeled chairs for infants and more particularly relates to a baby cart or stroller which may be converted to a seat for an infant in an automobile.

It is an object of my invention to provide a simple and rugged baby cart which may with a minimum of effort be adjusted so as to be suspended from the back of an automobile seat or like support as a baby-seat, and which may as easily be re-adjusted from an automobile baby seat to a cart.

A further object of my invention is to provide a convertible baby cart and automobile baby seat having wheels so arranged and mounted that the conversion from a compact wheel base suitable for enclosure in an automobile to a relatively long wheel base suitable for a self-supporting vehicle tends to be made automatically with the change of usage and no locking arrangement is required to hold the wheels in either relative position.

Still another object of my invention is to provide a convertible cart of the type described in which members rigidly connected to the frame rather than telescopically or foldingly connected thereto support the seat while the cart is suspended in an automobile and are braced by other members then telescoped or folded, it having been found that vibration and sudden stops and starts in an automobile have a tendency to loosen relatively movable parts and perhaps precipitate a baby, seat and all, onto the floor.

I accomplish the foregoing stated objects and others which will become apparent as the description of my invention proceeds by placing a suitable fabric seat upon a metallic frame, preferably tubular, which has the general conformation of modern spring chairs known to the furniture industry as S-type in which the side frames provide only two legs, at the front of the seat, and extend rearwardly from the legs to form a base and a seat-support, the frame not directly supporting the rear of the seat but acting as a spring. I then bend rearwardly the upright portions of the side frames which form the side members of the seat back and are usually called back posts, and then downwardly so that they form hooks integral with the seat frame, suitable for suspending the cart upon the back of an automobile seat. To said back posts, I attach the legs of a bow handle, slidably in guides, so that the handle may be raised to a position convenient for propelling a cart or lowered to a compacted position, and in either position but particularly in the latter, it will brace the side frames by its bow tension. To the forward base portion of the cart I attach suitable wheels and at the rear of the base I slidably mount a caster wheel so that it may be moved forwardly to substantially the plane of the back posts and rearwardly to an extended wheel-base position.

In the accompanying drawing, illustrative of a preferred embodiment of the invention broadly described above, Fig. 1 is a side elevational view of my convertible baby cart, the bow-handle and the caster-wheel being shown in broken line in their extended positions;

Fig. 2 is a plan view, the fabric seat being removed to show the underlying frame-work, and the bow-handle and caster wheel being shown extended; and Fig. 3 is a front elevational view of the lower portion of the cart frame.

Having reference now to the details of the drawing, I have shown a chair frame of more or less conventional tubular-spring type in which one continuous piece of tubing may have its central portion form a base cross-bar 6 and its end portions bent to form side-frames 7. The side-frames 7 each extend forwardly from the cross-bar 6 as base runners 8, then upwardly as legs 9 and then rearwardly as arm rests 10. From the rearward ends of the arm rests 10, the side frames extend upwardly as back posts 11, and these posts are bent rearwardly and then downwardly to form hooks 12. At the upper forward corners formed by the legs 9 and arm rests 10, the side-frame may be held apart and braced by a cross-piece 13. Another cross-piece 14 braces the base runners 8 forwardly of the cross-bar 6, and the lower forward corners formed by the legs 9 and base runners 8 are connected by an axle 15, on which are front wheels 16.

The arm rests 10 and cross-piece 13 support a fabric seat 17 of bag-like structure have holes 18 to accommodate an infant's legs. The axle 15 may be bent forwardly between its connections to the side-frames 7, to support a foot-rest 19.

The base cross-bar 6 and cross-piece 14 support tubular guides 21 in which the legs of a fork bracket 22 are slidable. The web of the fork bracket 22 pivotally holds the pin 23 of a caster-wheel 24 and preferably is sufficiently thick to extend rearwardly of any part of the wheel when the wheel is turned athwart the baby cart. The caster-wheel 24 may be moved, by telescopic movement of the bracket 22 in the guides 21, between a forward position in which it is stopped by the cross-bar 6 substantially in the plane of the back-posts 11, and a rearwardly extended position in which it may be stopped by any suitable stop means such as lugs 25 on the bracket 22.

Tubular guides 28 are attached to the back posts 11 to receive and telescopically guide the legs 29 of a bow-handle 30. The guides 28 are placed on the outer sides of the side-frames 7 and preferably slightly inclined so that the handle 30 will extend conveniently rearwardly of the caster-wheel 24 when both the handle and the wheel are in their extended positions. Preferably, the guides 28 are slightly oversize for the legs 29 and the legs 29 are slightly curved, so as to pass through the guides 28 with some friction, as this construction permits the handle 30 to be extended to a convenient height and to hold at such height without clamps or set-screws, and they are of sufficient length to extend below the base runners 8 when the handle is lowered to its compacted position.

To convert my invention from a baby-cart to a seat for suspension in an automobile, or for reconversion from a seat to a cart, only the positions of the handle 30 and of the caster-wheel 24 need be changed. The handle is readily slidable in the guides 28 and yet holds well in whatever position it is placed. The wheel 24 tends to assume its desired position from mere application to the usage. That is, when the baby-cart is suspended by the hooks 12 from the back of an automobile seat the wheel will come into contact with the lower part of the automobile seat back and will be pushed into its compacted position by the weight of the baby-cart. In this position, the caster-wheel will tend to turn to a position athwart the baby cart, as shown in solid line in Fig. 1, and the web of the fork bracket 22 will rest against the automobile seat, affording a relatively broad support. When the baby cart is used as a vehicle, drag upon the caster-wheel will cause the fork bracket 22 to slide outwardly in the guides 21 to the limit of the extended wheel-base position, and to remain there during such usage.

When the cart is used as an auxiliary seat within an automobile, it is suspended by hooks integral with the frame which therefore can not change position relatively to the fabric seat 17 and its occupant. The bow-handle 30, during this usage, will be in its lowered position, with the web of the bow close to the guides 28. Thereby, the handle, by its bow-tension effectively reinforces and spaces the side-frames 7 which are not otherwise held spaced rearwardly of and above the cross-piece 13. The lower ends of the legs 29 of the handle will be held spaced by the base runners 8, in turn spaced by the cross-bars 6 and 14, thus providing a very rigid yet simple construction for the protection of the baby.

I wish it understood that the scope and spirit of my invention is to be considered as bounded by the appended claims rather than by the precise details of the embodiment described herein as an example.

I claim:

1. In a baby cart: a seat frame having spaced side members forming arm rests and back posts, said back posts at their upper ends being bent rearwardly and downwardly to form hooks adapted to engage the back of an automobile seat; a seat held by said frame between said side members; guides on said back posts; a handle having spaced legs slidably engaged by said guides for movement between raised and lowered positions relative to said frame; wheels mounted on the forward portion of said frame; and a caster-wheel extensibly mounted on said frame rearwardly of said forwardly mounted wheels, for movement between a forward position in which said caster-wheel is substantially in the plane of said back posts and a rearward position.

2. In a baby cart: a one-piece tubular seat frame of S-type inclusive of back-posts; hooks on said back posts at their upper ends rigidly extending rearwardly therefrom and adapted to engage the back of an automobile seat; a seat supported by said frame; wheels on said frame; tubular guides on said back-posts; a tubular bow handle having its legs slidably engaged by said guides for movement between raised and lowered positions relative to said frame; the legs of said bow handle extending outwardly of and in close proximity to lower portions of said frame when in said lowered position whereby said legs are held spaced by the web of said bow and by said frame, and said back posts are held spaced by said legs.

3. In a baby cart: the construction set forth in claim 2, in which said tubular guides are slightly oversize for said handle legs and said handle legs are curved to afford a frictional resistance to sliding movement within said guides.

4. In a baby cart: a seat-frame having spaced side-members inclusive of back-posts; hooks on said back posts at their upper ends extending rearwardly therefrom and adapted to engage the back of an automobile seat; a seat supported by said frame; a handle adjustably secured to said frame for upward and rearward extension therefrom; wheels mounted on the forward portion of said frame; a rear wheel; a bracket on which said rear wheel is mounted; and guide means on said frame in which said bracket is freely slidable between a forward position in which said wheel is substantially in the plane of said back posts and a rearward position affording a relatively extended wheel-base.

5. In a baby cart: a seat frame having spaced side-members inclusive of back-posts; hooks on said back-posts at their upper ends extending rearwardly therefrom and adapted to engage the back of an automobile seat; a seat supported by said frame; a handle adjustably secured to said frame for upward and rearward extension therefrom; wheels mounted on the forward portion of said frame; a rear wheel; a bracket on which said rear wheel is pivotally mounted, extending rearwardly of said forward wheels, said rear wheel being adapted to be turned athwart said cart; and guide means on said frame in which said bracket is slidable between a forward position in which said wheel is substantially in the plane of said back-posts and a rearward position affording a relatively extended wheel-base.

CHARLES B. STAMBAUGH, Jr.

REFERENCES CITED

The following references are of record in the file of this patent:

UNITED STATES PATENTS

| Number | Name | Date |
|---|---|---|
| 2,305,719 | Lee | Dec. 22, 1942 |
| 2,429,797 | Borenzi | Oct. 28, 1947 |
| 2,435,733 | Belyeu | Feb. 10, 1948 |
| 2,544,099 | Malin | Mar. 6, 1951 |